US008538368B1

(12) United States Patent
Campbell

(10) Patent No.: US 8,538,368 B1
(45) Date of Patent: Sep. 17, 2013

(54) DYNAMIC POWER LIMITER CIRCUIT

(75) Inventor: Charles Campbell, McKinney, TX (US)

(73) Assignee: TriQuint Semiconductor, Inc., Hillsboro, OR (US)

(*) Notice: Subject to any disclaimer, the term of this patent is extended or adjusted under 35 U.S.C. 154(b) by 41 days.

(21) Appl. No.: 13/296,164

(22) Filed: Nov. 14, 2011

(51) Int. Cl.
H04B 1/16 (2006.01)

(52) U.S. Cl.
USPC ...... 455/334; 455/127.1; 455/333; 455/550.1

(58) Field of Classification Search
USPC ............ 455/127.1, 127.5, 129, 333, 334, 455/550.1, 556.1, 572
See application file for complete search history.

(56) References Cited

U.S. PATENT DOCUMENTS

| | | | |
|---|---|---|---|
| 3,462,697 A | 8/1969 | Gilbert | |
| 3,526,846 A | 9/1970 | Campbell | |
| 3,974,438 A | 8/1976 | Alves, III | |
| 4,114,108 A | 9/1978 | Faulkenberry et al. | |
| 4,737,733 A | 4/1988 | LaPrade | |
| 4,751,473 A | 6/1988 | Ono | |
| 4,821,000 A | 4/1989 | Imanishi | |
| 4,860,154 A | 8/1989 | Fazlollahi | |
| 5,392,464 A * | 2/1995 | Pakonen | 455/115.1 |
| 5,834,978 A | 11/1998 | Cho | |
| 6,215,987 B1 * | 4/2001 | Fujita | 455/127.3 |
| 6,850,119 B2 | 2/2005 | Arnott | |
| 7,145,397 B2 | 12/2006 | Yamamoto et al. | |
| 7,395,087 B2 * | 7/2008 | Watanabe | 455/553.1 |
| 7,486,144 B2 | 2/2009 | Mitzlaff et al. | |
| 7,738,845 B2 * | 6/2010 | Takahashi et al. | 455/126 |
| 7,760,027 B2 | 7/2010 | Murji et al. | |
| 7,873,333 B2 * | 1/2011 | Tanaka et al. | 455/126 |
| 8,223,886 B2 * | 7/2012 | Kitamura et al. | 375/297 |
| 2006/0267688 A1 | 11/2006 | Tanoue et al. | |
| 2011/0292554 A1 | 12/2011 | Yao et al. | |

OTHER PUBLICATIONS

Kim, Min-Gun, et al., "An FET-Level Linearization Method Using a Predistortion Branch FET," IEEE Microwave and Guided Wave Letters, vol. 9, No. 6, pp. 233-235, Jun. 1999.
Lee, C.P., et al., "Averaging and Cancellation Effect on High-Order Nonlinearity of a Power Amplifier," IEEE Transactions on Circuits and Systems—I: Regular Papers, vol. 54, No. 12, pp. 2733-2739, Dec. 2007.
Non-Final Office Action in U.S. Appl. No. 12/788,267 mailed Oct. 12, 2011.
Notice of Allowance in U.S. Appl. No. 12/788,267 mailed Feb. 3, 2012.
Non-Final Office Action in U.S. Appl. No. 13/115,024 mailed Nov. 26, 2012.
Shifrin, M., et al.; "High Power Control Components Using a New Monolithic FET Structure;" IEEE Microwave and Millimeter-Wave Monolithic Circuits Symposium; 1989.
Maas, A.P.M., et al; "Set of X-Band Distributed Absorptive Limiter GaAs MIMICs;" Proceedings of the 4th European Radar Conference; Munich, Germany; Oct. 2007.
Pantellini, Alessio, et al.; "Performance Assessment of GaN HEMT Technologies for Power Limiter and Switching Applications;" Proceedings of the 5th European Microwave Integrated Circuits Conference; Paris, France, Sep. 27-28, 2010.

* cited by examiner

Primary Examiner — Nhan Le
(74) Attorney, Agent, or Firm — Schwabe, Williamson & Wyatt, P.C.

(57) ABSTRACT

Apparatus and methods for limiting a radio frequency (RF) signal are disclosed. An example apparatus includes a detector configured to generate a detection signal based on a power of a RF signal on a signal path. A bias circuit may bias a switch circuit to dynamically limit the RF signal based on the detection signal.

20 Claims, 9 Drawing Sheets

DYNAMIC POWER LIMITER CIRCUIT

TECHNICAL FIELD

The present disclosure generally relates to electronic circuits. For example, the technology of the present disclosure is applicable to microwave and other radio frequency (RF) limiter circuits.

BACKGROUND

Limiter circuits are employed in a wide range of systems and devices for a variety of applications. For example, limiter circuits may be employed in microwave sensing and communication systems to limit signal strength (e.g., voltage, current, and/or power) and to prevent system overloading, prevent damage of system components, limit signal sensitivity, and/or the like. In military applications, limiter circuits may be particularly useful to prevent damage to radar, electronic warfare, and communication system receivers and other components from intentional or unintentional overloading and possible damage from high-power signals.

Typical limiter circuits are associated with trade-offs between signal-limiting functionalities and maintaining signal quality. For example, a limiter circuit designed to limit signals above a relatively modest cut-off threshold may adversely affect signal quality (e.g., distort the signal, decrease a signal to noise ratio (SNR), increase a bit error rate (BER), etc.) and hence impact system performance. In contrast, a limiter circuit designed to pass signals to a relatively high cut-off threshold may increase the risk of system overload and/or damage.

Typical limiter circuits may also be difficult to integrate with other elements in a monolithic integrated circuit (IC), multi-chip module (MCM), and/or the like. For example, typical limiter circuits may be physically bulky and thus difficult to integrate onto a monolithic IC or MCM. In addition, fabrication processes and materials for typical limiter circuits may not be compatible with fabrication processes and materials for other system elements. Thus, additional fabrication steps and/or other difficulties with integrating typical limiter circuits onto a monolithic IC or MCM may be incurred.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other.

Apparatuses and methods for limiting a radio frequency (RF) signal are disclosed. An example apparatus includes a power limiter that has a bias circuit to bias components of a switch circuit in a manner to set the switch circuit in various operational states, with each of the operational states having a respective power-limiting and insertion loss characteristics. The bias circuit may bias the switch circuit based on a detection signal provided by a detector circuit. The detection signal may be based on a power of the RF signal. The switch circuit may include one or more components such as, but not limited to, field effect transistors (FETs). The FETs may be gallium nitride (GaN) transistors, gallium arsenide (GaAs) transistors, and/or high electron mobility transistors (HEMTs).

Figure 1:
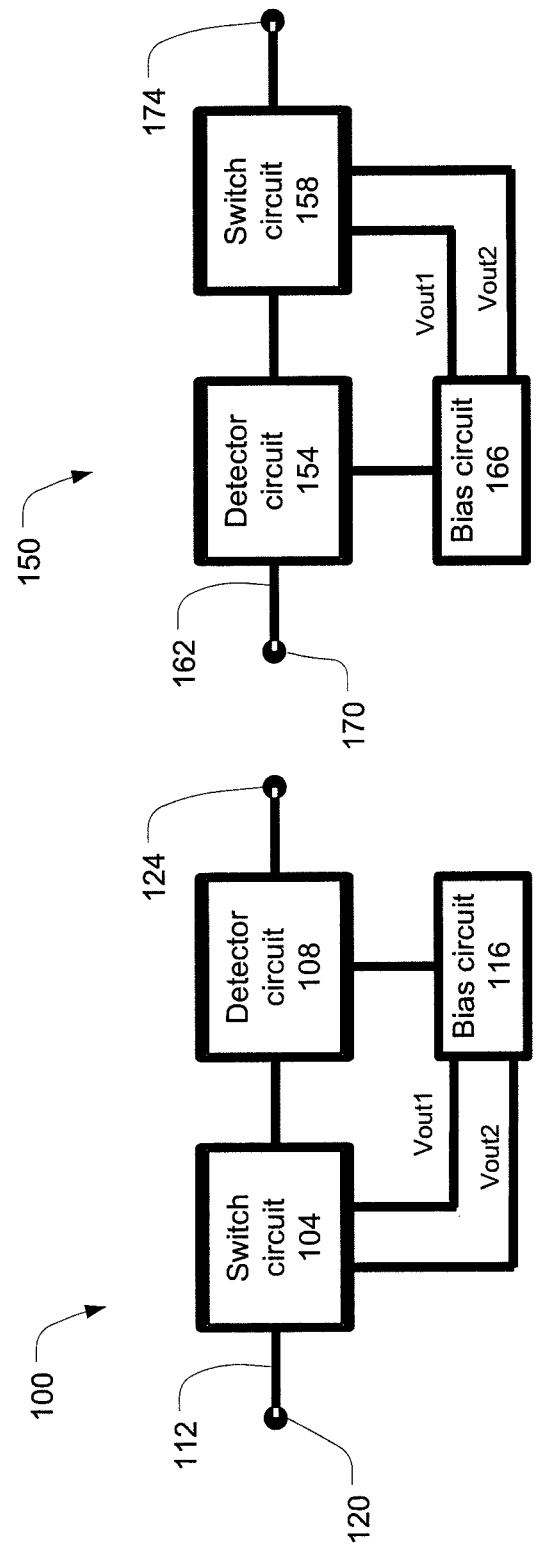
FIGS. 1(a) and 1(b) respectively illustrate power limiters in accordance with some embodiments.

FIGS. 1(a) and 1(b) respectively illustrate power limiters 100 and 150 in accordance with some embodiments. Power limiter 100 may include a switch circuit 104 and a detector circuit 108 coupled with a signal path 112 having an input node 120 and an output node 124. The power limiter 100 may further include a bias circuit 116 coupled with both the detector circuit 108 and the switch circuit 104. The components of the power limiter 100 may be arranged in a feedback topology with the detector circuit 108 coupled with the signal path 112 at a point between an output node 124 and the switch circuit 104.

The switch circuit 104 may be a single pole, single throw (SPST) RF switch. The bias circuit 116 may control the operational state of the switch circuit 104 by way of bias signals Vout1 and Vout2. A first operational state may be configured to provide greater limiting of signal power of an RF signal propagating on the signal path relative to a second operational state, which may be configured to provide less insertion loss relative to the first operational state. The first operational state may also be referred to as a high-isolation state or an off state. The second operational state may also be referred to as a low-loss state or an on state.

The power limiter 150 may include components similar to power limiter 100. For example, power limiter 150 may include a detector circuit 154 and switch circuit 158 coupled with a signal path 162 having an input node 170 and an output node 174. The power limiter 150 may further include a bias circuit 166 coupled with both the detector circuit 154 and the switch circuit 158. The power limiter 150 may differ from the power limiter 100 in that the components of the power limiter 150 may be arranged in a feedforward topology with the detector circuit 154 coupled with the signal path 162 at a point between the input node 170 and the switch circuit 158.

Figure 2:
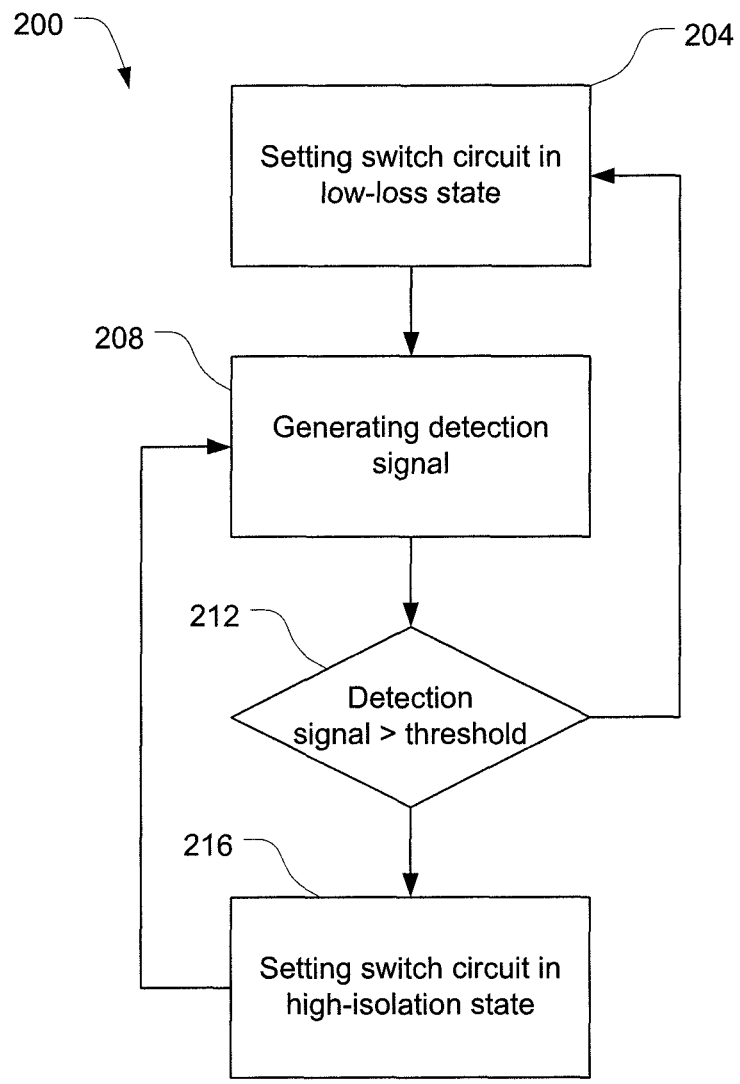
FIG. 2 is a flowchart depicting operation of a power limiter in accordance with some embodiments.

FIG. 2 is a flowchart 200 depicting operation of a power limiter, e.g., power limiter 100 or 150, in accordance with some embodiments. At block 204, the operation may include setting a switch circuit, e.g., switch circuit 104 or 158, in a low-loss state. The setting of the switch circuit in a low-loss state may be done by the bias circuit, e.g., bias circuit 116 or bias circuit 166, controlling the bias signals in an appropriate manner. In an embodiment in which the switch circuit is a GaN FET-based RF switch circuit, the low-loss state may have Vout1 of approximately −0.1 volts (V) or more and Vout2 of approximately −10 V or less. In an embodiment in which the switch circuit is a GaAs FET-based RF switch circuit, the low-loss state may have Vout1 of approximately −0.1 volts (V) or more and Vout2 of approximately −3 V or less. In general, the low-loss state may be achieved by the bias signals being set at values that are sufficient to provide insertion loss within an acceptable range of insertion loss.

Figures 3A, 3B:
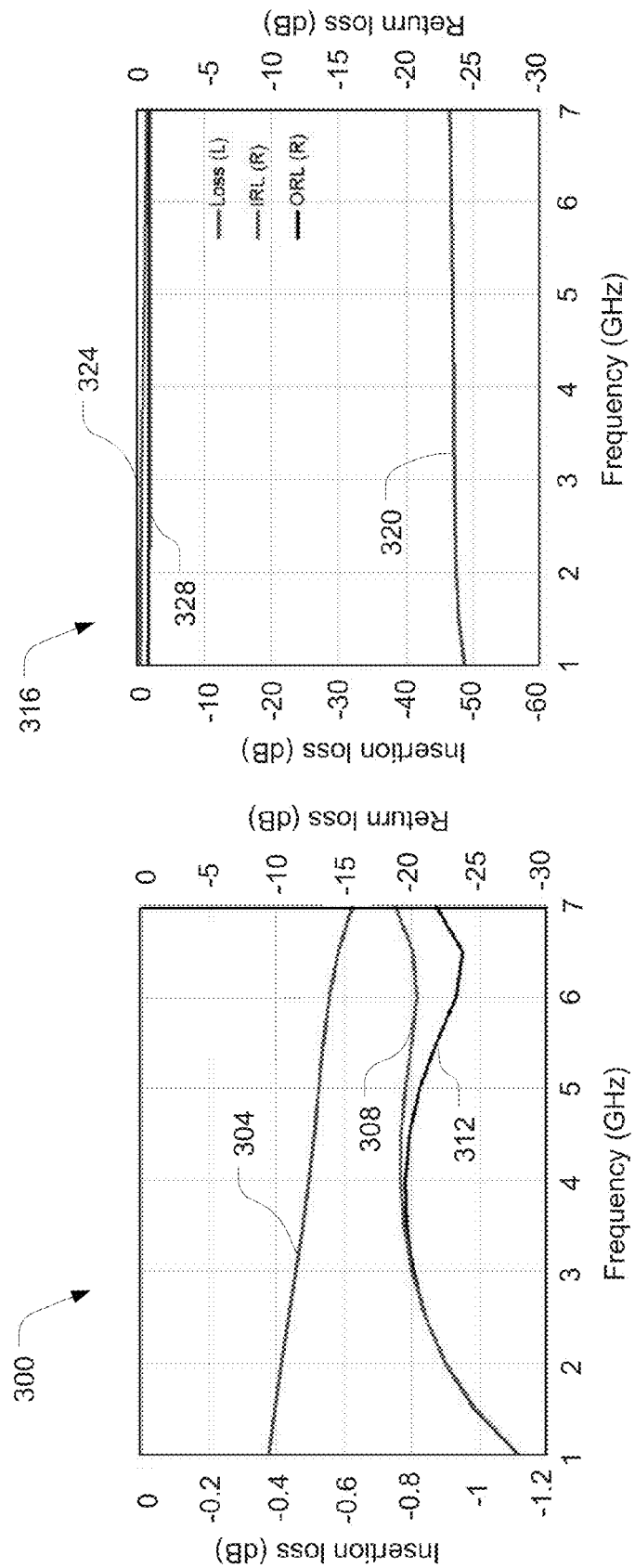
FIGS. 3(a) and 3(b) are graphs that show losses in a low-loss state and a high-isolation state, respectively, in accordance with some embodiments.

FIG. 3(a) is a graph 300 that shows losses of a FET-based RF switch circuit, e.g., switch circuit 104 or 158, in a low-loss state in accordance with some embodiments. In particular, the graph shows line 304 representing insertion losses, in decibels (dB), over a frequency range of 1 gigahertz (GHz) to 7 GHz. The graph further shows line 308 representing input return losses, in dB, and line 312 representing output return losses over the same frequency range. As can be seen, the insertion loss, between approximately −0.4 dB and −0.6 dB, is in a relatively low range as desired in the low-loss state.

At block 208, the operation may include generating a detection signal with, e.g., detector circuit 108 or 154, in accordance with some embodiments. The detection signal may be based on, e.g., proportional to, the signal power of the RF signal. In a feedback topology, the detection signal may be based on the output signal power, i.e., the signal power of RF signal as output by the switch circuit 104. In a feedforward topology, the detection signal may be based on the input signal power, i.e., the signal power of RF signal as input to the switch circuit 158.

At block 212, the operation may include a determination of whether the detection signal is greater than a threshold. In some embodiments, the threshold may be an externally provided threshold signal. In other embodiments, the threshold may relate to turn-on/turn-off threshold voltages of, e.g., one or more FET switches. While the described embodiments discuss the determination of block 212 to be based on the detection signal being greater than the threshold, other embodiments may use other bases for the determination including, e.g., other comparisons between the detection signal and the threshold.

If, at block 212, it is determined that the detection signal is not greater than the threshold, the operation may advance to setting of the switch circuit in the low-loss state at block 204. Setting the switch circuit in the low-loss state may include keeping the switch circuit in the low-loss state in the event the switch circuit is currently in the low-loss state.

If, at block 212, it is determined that the detection signal is greater than the threshold, the operation may advance to block 216. At block 216, the operation may include setting the switch circuit, e.g., switch circuit 104 or 158, in a high-isolation state. The setting of the switch circuit in a high-isolation state may be done by the bias circuit, e.g., bias circuit 116 or bias circuit 166, controlling the bias signals in an appropriate manner. In an embodiment in which the switch circuit is a GaN FET-based RF switch circuit, the low-loss state may have Vout1 of approximately −10 volts (V) or less and Vout2 of approximately −0.1 V or more. In an embodiment in which the switch circuit is a GaAs FET-based RF switch circuit, the low-loss state may have Vout1 of approximately −3 volts (V) or less and Vout2 of approximately −0.1 V or more. In general, the high-isolation state may be achieved by the bias signals being set at values that are sufficient to produce desired amount of insertion loss to limit the RF power to a predetermined level.

FIG. 3(b) is a graph 316 that shows losses of a FET-based RF switch circuit, e.g., switch circuit 104 or 158, in a high-isolation state in accordance with some embodiments. In particular, the graph 316 shows line 320 representing insertion losses, in dB, over a frequency range of 1 GHz to 7 GHz. The graph further shows line 324 representing input return losses, in dB, and line 328 representing output return losses, in dB, over the same frequency range. As can be seen, the insertion loss, between approximately −50 dB and −47 dB, is in a relatively high range as desired of the high-isolation state.

Following block 216, the operation may advance to the generating of the detection signal at block 208. Setting the switch circuit in the high-isolation state may include keeping the switch circuit in the high-isolation state in the event the switch circuit is currently in the high-isolation state.

Figure 4:
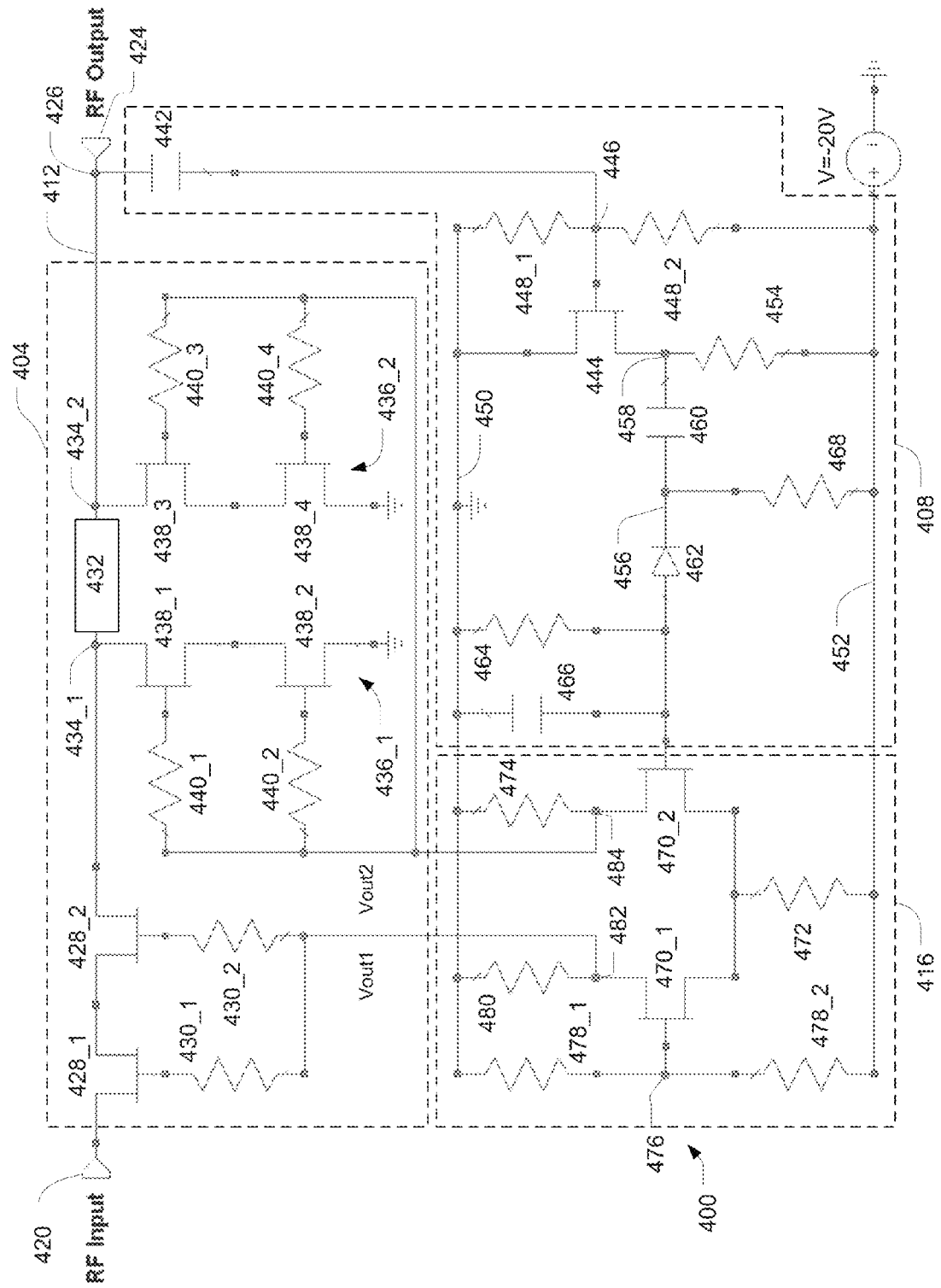
FIG. 4 illustrates a feedback power limiter in accordance with some embodiments.

FIG. 4 illustrates a feedback power limiter 400 in accordance with some embodiments. The feedback power limiter 400 may, in some embodiments, be implemented entirely in a monolithic integrated circuit. In other embodiments, the feedback power limiter 400 may be implemented in a multi-chip module.

Feedback power limiter 400 may have components similar to power limiter 100 and may operate in substantially the same way as described above. In particular, the feedback power limiter 400 may include a switch circuit 404 and a detector circuit 408 coupled with a signal path 412 at node 426. The signal path 412 may have an input node 420, to receive an RF input, and an output node 424, to output an RF output. The power limiter 400 may further include a bias circuit 416 coupled with the switch circuit 404 and the detector circuit 408 as shown.

The switch circuit 404 is an SPST RF switch having series FETs 428_1-2 disposed on the signal path 412 with their gates configured to receive a first bias signal, Vout1, through respective resistors 430_1-2. The switch circuit 404 may also include an inductive element 432 having terminals 434_1-2 disposed on the signal path 412. The inductive element 432 may be an inductor or a transmission line.

The switch circuit 404 may further include shunt segments 436_1-2. Each of the shunt segments is shown with two FETs, e.g., FETs 438_1-2 of shunt segment 436_1 and FETs 438_3-4 of shunt segment 436_2. The gates of the FETs 438 may be configured to receive a second bias signal, Vout2, through respective resistors 440_1-4. The resistors 430 and 440 may be large in order to couple the respective bias voltages to the respective gates without affecting the RF signal on the signal path 412.

Arranging the series and shunt FETs in pairs may be used to increase the power handling of the stacked FET combinations with respect to using single FETs; however, other embodiments may have one series/shunt FET or more than two series/shunt FETs for each segment.

The detector circuit 408 may include a capacitor 442 coupled with the signal path 412 at node 426. The capacitor 442 may be configured to couple of portion of the RF output signal to the remaining components of the detector circuit 408. The coupled portion of the RF output signal may be small enough to avoid undesirable contributions to the insertion loss, yet large enough to drive operation of the detector circuit 408 and bias circuit 416 in desired manner.

The detector circuit 408 may further include a FET 444, configured as a source-follower. The FET 444 may serve as a buffer amplifier to provide a high impedance at an input (e.g., gate of the FET 444), to prevent undesirable loading of the switch circuit 404, and a low-impedance on an output (e.g., node 458), to drive a significant amount of current into diode 462. A gate of the FET 444 may be coupled with the capacitor 442 at a node 446. Node 446 may be disposed between resistors 448_1-2 of a voltage divider coupled with a ground rail 450 and a source rail 452. The source voltage, as shown, is −20 V. The FET 444 may be further coupled with the ground rail 450 and the source rail 452, as shown. The FET 444 may be coupled with the source rail 452 through resistor 454.

The detector circuit 408 may include a signal line 456 coupled with a node 458 that is between the FET 444 and the resistor 454. The signal line may have a direct current (DC) blocking capacitor 460 that is configured to prevent an accidental biasing of the diode 462 of the signal line 452. The core of the detector circuit 408 may include the diode 462, a resistor 464 and a capacitor 466 coupling the signal line 456 with the ground rail 450, and a resistor 468 coupling signal line 456 with the source rail 452.

The resistors 464 and 468 are configured to run a small amount of current through the diode 462 in order to set a voltage close to a turn-on voltage of the diode 462. This may allow the diode 462 to quickly turn on at a relatively low power level. The capacitor 466 is a filter capacitor that turns a rectified signal on the signal line 456 into a DC signal.

The bias circuit 416 may include a high-gain differential amplifier including FETs 470_1-2 coupled with one and the detector circuit 408 and switch circuit 404 as shown. In particular, the FET 470_2 may have a gate coupled with the signal line 456, a first terminal coupled with the source rail 452 through a resistor 472, and a second terminal coupled with the ground rail 450 through resistor 474.

The FET 470_1 may have a gate coupled with a node 476 between resistors 478_1-2 of a voltage divider coupled between the source rail 452 and the ground rail 450. The FET 470_1 may further include a first terminal coupled with the source rail 452 through the resistor 472 and a second terminal coupled with the ground rail 450 through resistor 480.

The resistors 478 may set a voltage at node 476 to be roughly equal to a voltage at a gate of the transistor 470_2 so that the differential amplifier is in a high-gain area. This may set the differential amplifier in a state such that it can quickly respond to a relatively small amount of DC voltage, positive or negative, to complementarily change bias signals, Vout1 at node 482 and Vout2 at node 484, from minimum voltage (e.g., approximately 0 V) to a maximum voltage (e.g., approximately −10 V for GaN transistors or approximately −0.3 V for GaAs transistors).

In some embodiments, an external threshold voltage, V_th, may be coupled with the node 476. This may provide an embodiment with the flexibility to make the limiting threshold, e.g., the threshold at which the switch circuit 404 will be set to the high-insertion loss state, somewhat programmable.

Figure 5:
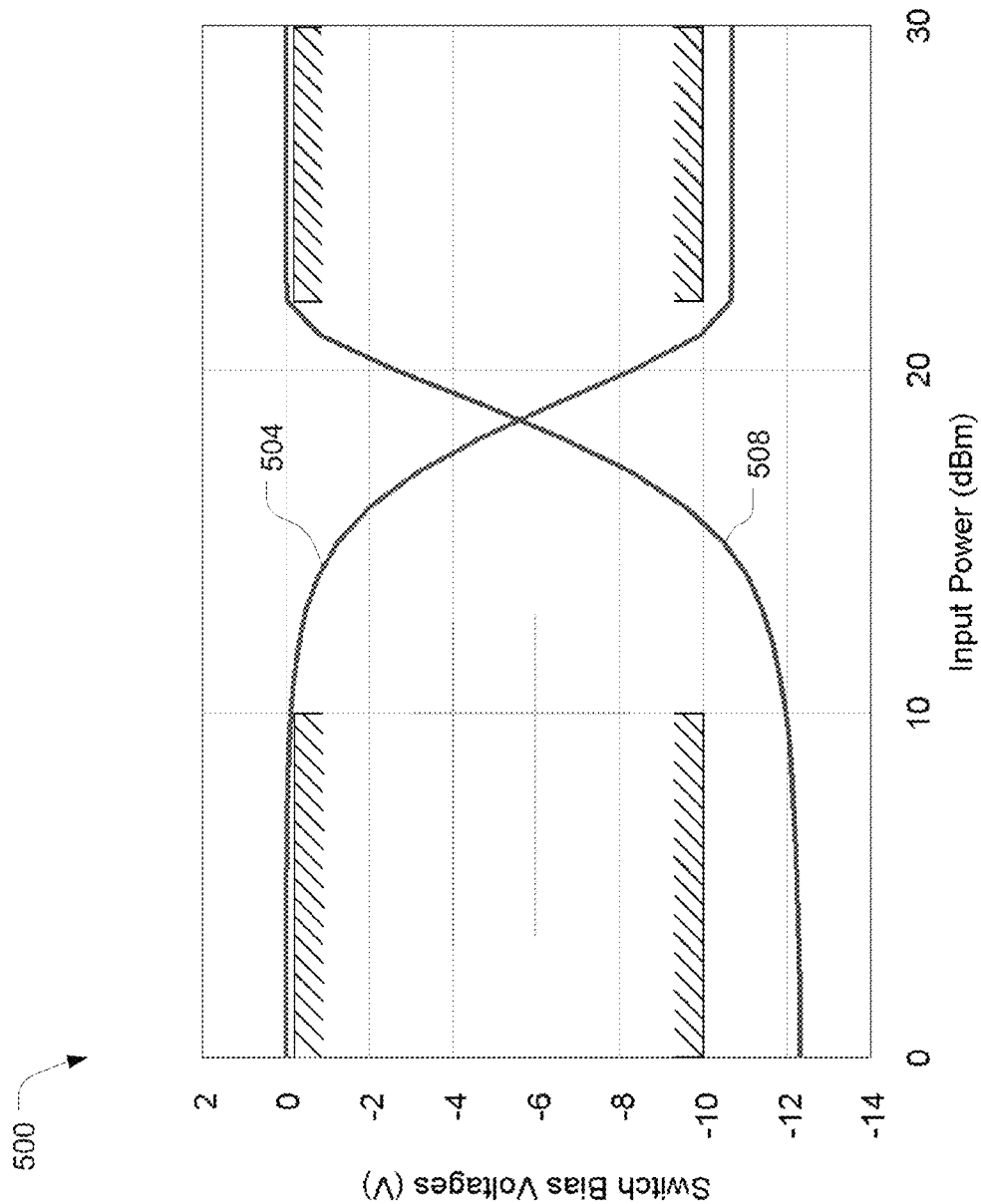
FIG. 5 is a graph illustrating switch bias voltages as function of input power in accordance with some embodiments.

FIG. 5 is a graph 500 illustrating switch bias voltages of the bias signals, Vout1 and Vout2, as function of input power, in dBm, of an RF signal in accordance with some embodiments. Graph 500 shows values for a specific embodiment in which the transistors 428 and 438 of the switch circuit 404 are GaN transistors. Other embodiments may use other values with other GaN transistors or other types of transistors, e.g., GaAs transistors.

Graph 500 shows that, for low input powers (e.g., less than approximately 12 dBm), Vout1 504 is greater than −0.1 volts and Vout2 508 is less than −10 volts. This may turn the transistors 428 on and the transistors 438 off. The transistors 438, when off, may act as capacitors and, in conjunction with the inductive element 432, may appear as a capacitor-inductor-capacitor (CLC) low-pass filter. The placement of the inductive element 432 between the two shunt segments may be done to provide a wider frequency response.

As the input power increases, the bias signals switch in a complementary manner and provide, for high output powers (e.g., greater than approximately 22 dBm), Vout1 to be less than −10 volts and Vout2 to be greater than −0.1 volts. This may turn the transistors 428 off and the transistors 438 on to shunt at least a portion of the RF signal.

In various embodiments, the point at which Vout1 504 crosses over Vout2 508 can be adjusted a few dBm in either direction by adjusting the values of resistors 478_1 and 478_2.

Figure 6:
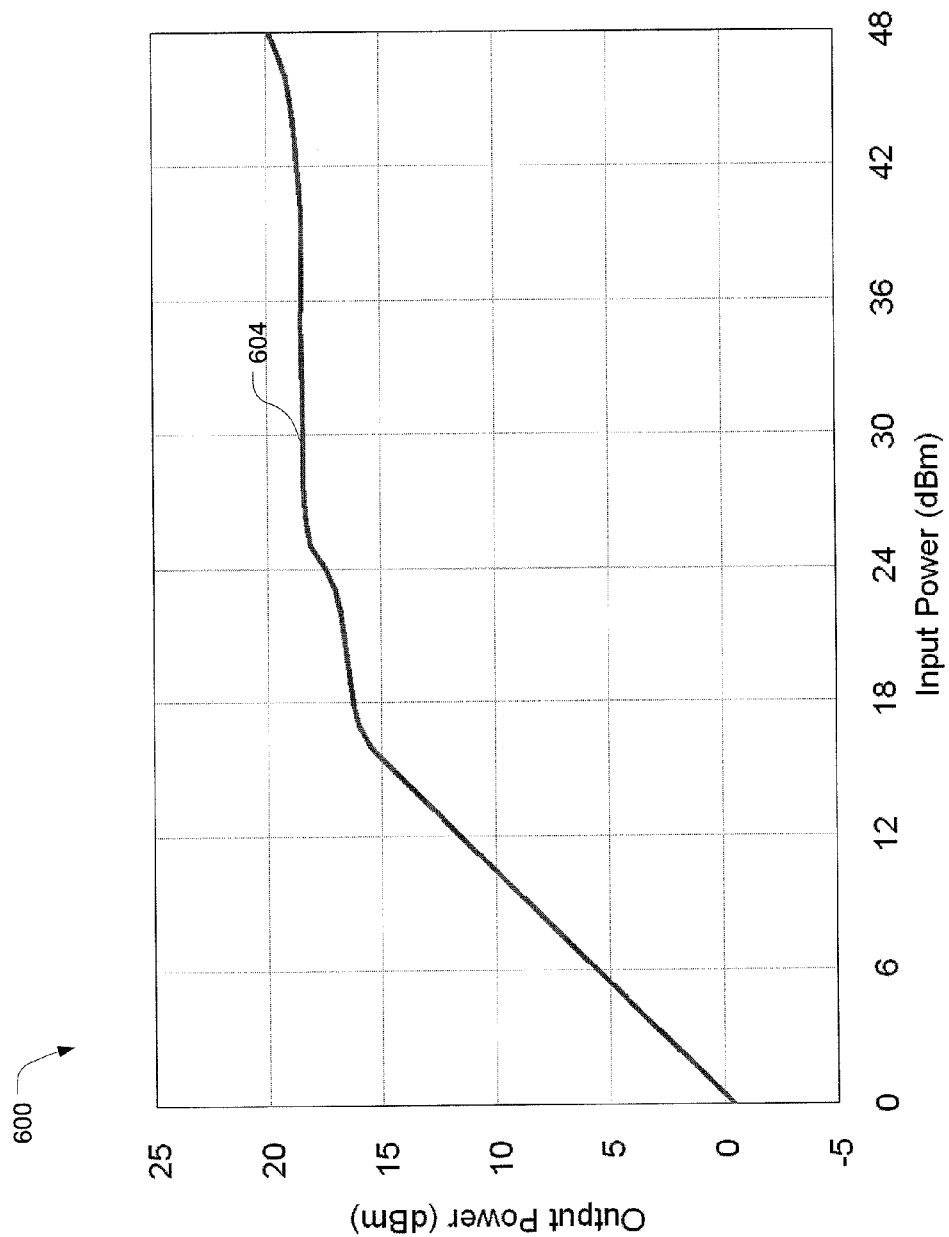
FIG. 6 is a graph illustrating a compression curve of the feedback power limiter in accordance with some embodiments.

FIG. 6 is a graph 600 illustrating a compression curve 604 of the feedback power limiter 400 as a function of output power versus input power in accordance with some embodiments. The input and output power may be substantially linear when the input power is within a range of 0 to approximately 15 dBm. When the input power is greater than approximately 15 dBm, the switch circuit 404 may be set to a high-isolation state resulting in a limiting of further increases in the output power. When the input power gets to a very high input power, e.g., around 48 dBm, the switch circuit 404 may be overloaded and unable to fully limit further increases of the output power.

Figure 7:
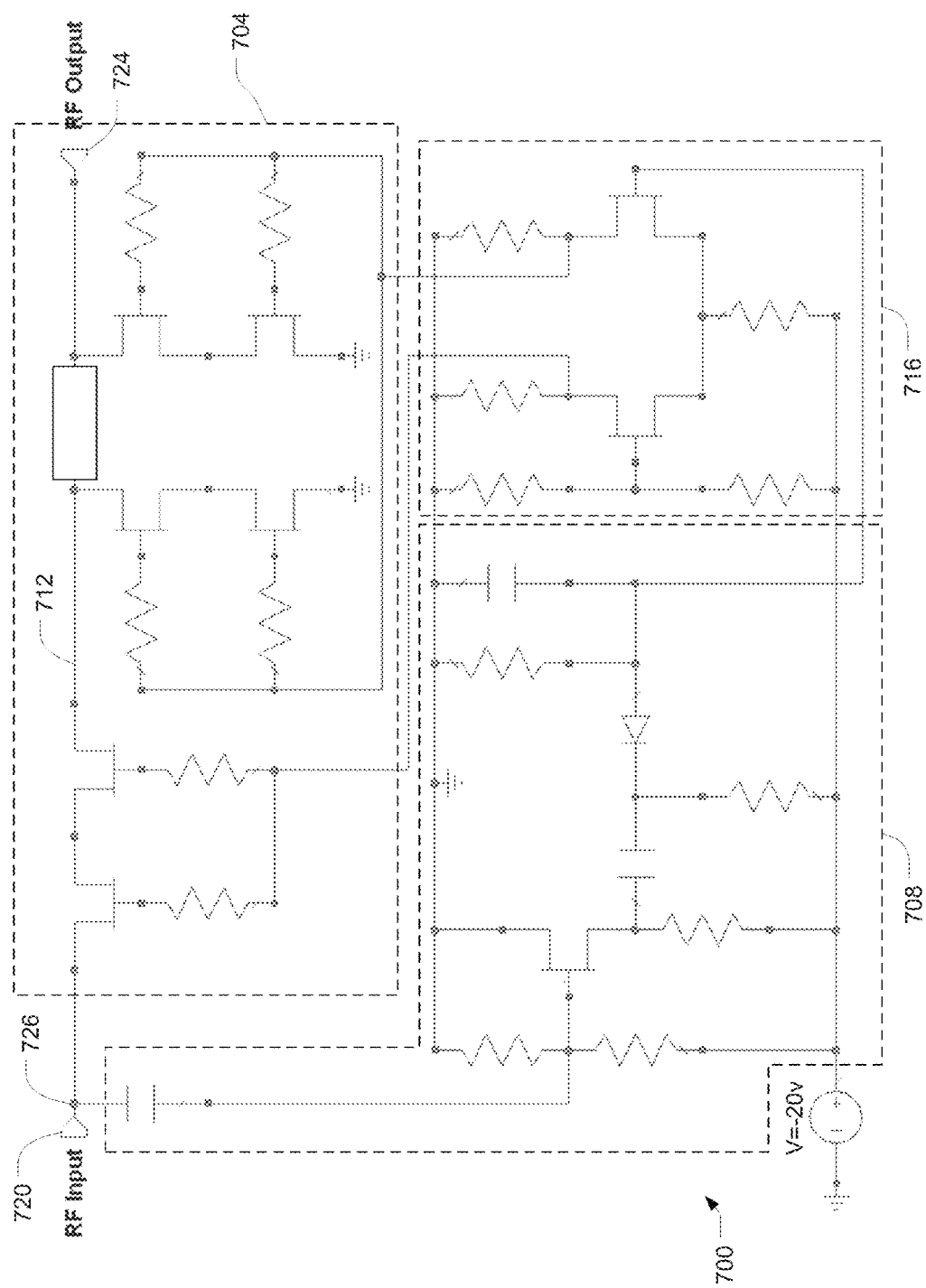
FIG. 7 illustrates a feedforward power limiter in accordance with some embodiments.

FIG. 7 illustrates a feedforward power limiter 700 in accordance with some embodiments. Feedforward power limiter 700 may have components similar to power limiter 150 and/or feedback power limiter 400 and may operate in substantially the same way as described above with respect to either limiter. The feedforward power limiter 700 may differ from the feedback power limiter 400 in that a detector circuit 708 is coupled with a signal path 712 at a node 726 that is between an input node 720 and a switch circuit 704. The detector circuit 708 may, therefore, operate on the input signal power, as opposed to operating on the output signal power as does the detector 408.

Figure 8:
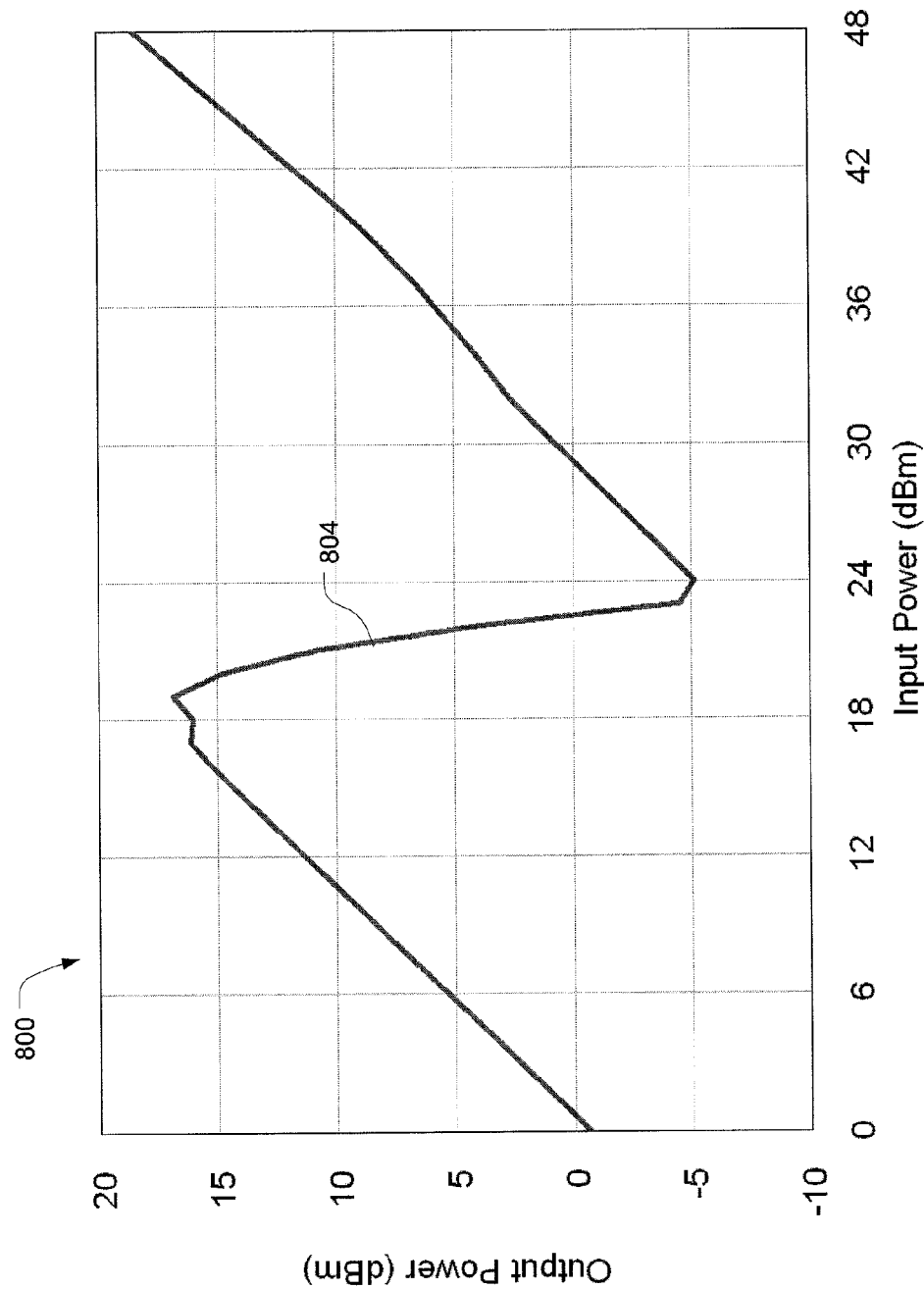
FIG. 8 is a graph illustrating a compression curve of the feedforward power limiter in accordance with some embodiments.

FIG. 8 is a graph 800 illustrating a compression curve 804 of the feedback power limiter 800 as a function of output power versus input power in accordance with some embodiments. Unlike the compression curve 604, the compression curve 804 shows that the input and output power may be substantially linear when input powers are less than approximately 17 dBm, when switch circuit 704 is in the low-loss state, and above approximately 24 dBm, when switch circuit 704 is in high-isolation state. In the transition from the low-loss to high-isolation states, the switch circuit 704 may add a set amount of isolation, e.g., approximately 22 dBm of isolation, and the linear relationship between input power and output power may otherwise stay the same.

The feedback power limiter 400 and the feedforward power limiter 700 may be particularly suitable for different operational scenarios. For example, in operation the feedforward power limiter 700 may react to a spike in input power slightly faster than the feedback power limiter 400, however, the feedback power limiter 400 may have less insertion loss than the feedforward power limiter 700.

Figure 9:
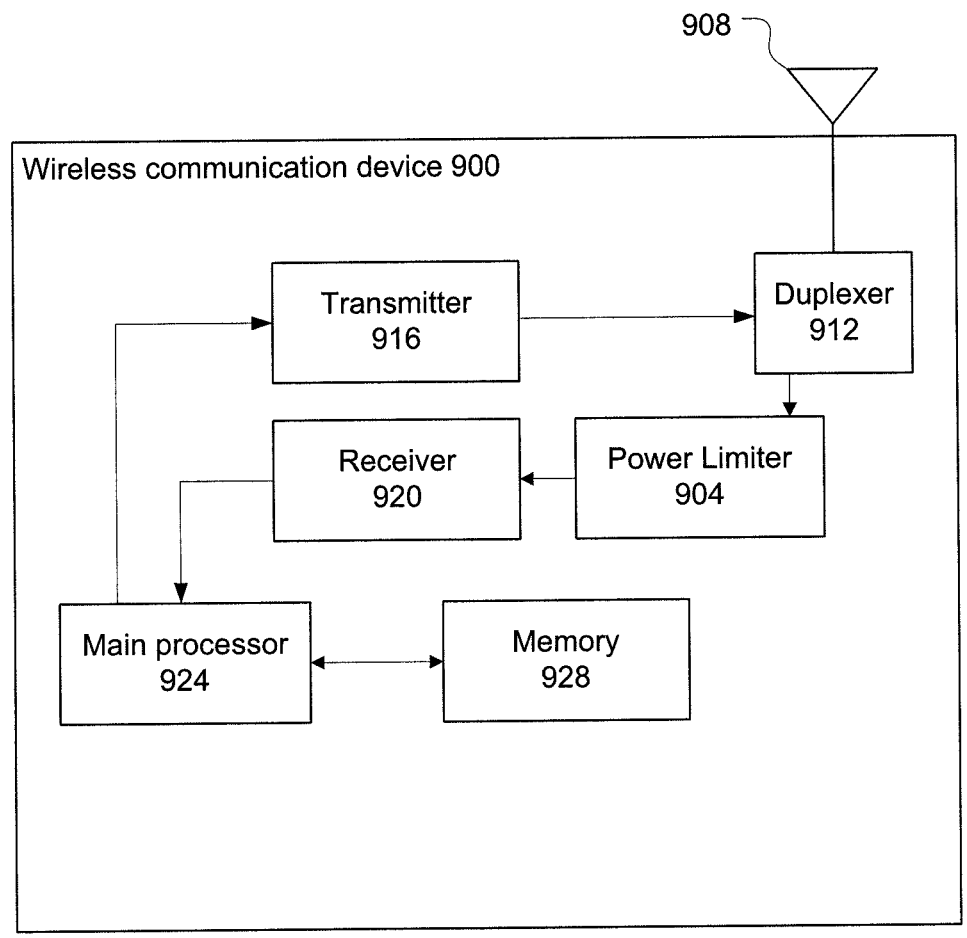
FIG. 9 illustrates an example system in accordance with some embodiments.

A block diagram of an exemplary wireless communication device 900 incorporating a power limiter 904, which may be similar to power limiter 100, power limiter 150, feedback power limiter 400, and/or feedforward power limiter 700, is illustrated in FIG. 9 in accordance with some embodiments. In addition to the power limiter 904, the wireless communication device 900 may have an antenna structure 908, a duplexer 912, a transmitter 916, a receiver 920, a main processor 924, and a memory 928 coupled with each other at least as shown. While the wireless communication device 900 is shown with transmitting and receiving capabilities, other embodiments may include devices with only receiving capabilities.

In various embodiments, the wireless communication device 900 may be, but is not limited to, a mobile telephone, a paging device, a personal digital assistant, a text-messaging device, a portable computer, a desktop computer, a base station, a subscriber station, an access point, a radar system, a satellite communication device, or any other device capable of wirelessly transmitting/receiving RF signals and benefiting from power limiting as described herein.

The main processor 924 may execute a basic operating system program, stored in the memory 928, in order to control the overall operation of the wireless communication device 900. For example, the main processor 924 may control the reception of signals by receiver 920 and the transmission of signals by transmitter 916. The main processor 924 may be capable of executing other processes and programs resident in the memory 928 and may move data into or out of memory 928, as desired by an executing process.

The transmitter 916 may receive outgoing data (e.g., voice data, web data, e-mail, signaling data, etc.) from the main processor 924 and may generate RF signal(s) to represent the outgoing data. The RF signals may then be provided to the duplexer 912 and transmitted over the air by the antenna structure 908.

The power limiter 904 may receive an incoming RF signal from antenna structure 908 through the duplexer 912 and pass the RF signal through to the receiver 920. The power limiter 904 may operate to dynamically limit the RF signal as described herein to protect components of the receiver 920 while maintaining acceptable levels of insertion loss associated with the power limiter 904. The receiver 920 may receive the incoming RF signals and provide incoming data transmitted by the RF signals to the main processor 924 for further processing.

In various embodiments, the antenna structure 908 may include one or more directional and/or omnidirectional antennas, including, e.g., a dipole antenna, a monopole antenna, a patch antenna, a loop antenna, a microstrip antenna or any other type of antenna suitable for over-the-air transmission/reception of RF signals.

Those skilled in the art will recognize that the wireless communication device 900 is given by way of example and that, for simplicity and clarity, only so much of the construction and operation of the wireless communication device 900 as is necessary for an understanding of the embodiments is shown and described. Various embodiments contemplate any suitable component or combination of components performing any suitable tasks in association with wireless communication device 900, according to particular needs. Moreover, it is understood that the wireless communication device 900 should not be construed to limit the types of devices in which embodiments may be implemented.

While the above detailed description describes certain embodiments of the invention, and describes the best mode contemplated, no matter how detailed the above appears in text, the invention can be practiced in many ways. Details of the system may vary in implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description explicitly defines such terms. Accordingly, the actual scope of the invention encompasses not only the disclosed embodiments, but also all equivalent ways of practicing or implementing the invention under the claims.

What is claimed is:

1. A power limiter comprising:
a signal path configured to propagate a radio frequency (RF) signal;
a switch circuit coupled with the signal path;
a detector circuit coupled with the signal path and configured to provide a detection signal based on signal power of the RF signal; and
a bias circuit coupled with the switch circuit and configured to bias one or more components of the switch circuit to set the switch circuit in a first operational state or a second operational state based on the detection signal, wherein the first operational state is configured to provide greater limiting of the signal power relative to the second operational state and the second operational state is configured to provide less insertion loss relative to the first operational state.

2. The power limiter of claim 1, wherein the signal path has an input node configured to receive the RF signal and an output node configured to output the RF signal and the detector circuit is coupled with the signal path between the switch circuit and the output node.

3. The power limiter of claim 1, wherein the signal path has an input node configured to receive the RF signal and an output node configured to output the RF signal and the detector circuit is coupled with the signal path between the input node and the switch circuit.

4. The power limiter of claim 1, wherein the switch circuit comprises a single-pole, single-throw switch biased by two bias signals received from the bias circuit.

5. The power limiter of claim 4, wherein the bias circuit is configured to output a first and a second bias signal to bias the one or more components of the switch circuit, wherein the bias circuit comprises:
- a differential amplifier having a pair of transistors, wherein:
  - a first transistor of the pair includes a first terminal coupled with ground through a first resistor, a second terminal coupled with a voltage source through a second resistor, and a gate coupled with the detector circuit to receive the detection signal, and
  - a second transistor of the pair includes a first terminal coupled with ground through a third resistor, a second terminal coupled with the second terminal of the first transistor, and a gate coupled with a voltage divider,
- wherein the differential amplifier is configured to output the first bias signal at the first terminal of the first transistor and to output the second bias signal at the first terminal of the second transistor.

6. The power limiter of claim 5, wherein the detector circuit comprises:
- a capacitor coupled with the signal path;
- a transistor configured as a source follower and having a first terminal coupled with ground, a second terminal coupled with the voltage source through a fourth resistor, and a gate coupled with the capacitor; and
- a signal line coupled with the second terminal of the transistor of the detector circuit and the gate of the first transistor of the pair of transistors of the bias circuit, the signal line having a diode.

7. The power limiter of claim 6, wherein the detector further comprises:
- a capacitor coupled between the signal line and ground;
- a fifth resistor coupled between the signal line and ground and coupled with a first terminal of the diode; and
- a sixth resistor coupled between the signal line and the voltage source and coupled with a second terminal of the diode.

8. The power limiter of claim 5, wherein the detector circuit comprises:
- a signal line having a diode and coupled with the gate of the first transistor of the pair of transistors of the bias circuit;
- a capacitor coupled between the signal line and ground;
- a fifth resistor coupled between the signal line and ground and coupled with a first terminal of the diode; and
- a sixth resistor coupled between the signal line and the voltage source and coupled with a second terminal of the diode.

9. The power limiter of claim 4, wherein the switch circuit comprises:
- one or more series field effect transistors (FETs) disposed on the signal path, wherein individual FETs of the one or more series FETs have gates that are configured to receive the first bias signal of the two bias signals; and
- one or more shunt FETs coupled with the signal path, wherein individual FETs of the one or more shunt FETs have gates that are configured to receive a second bias signal of the two bias signals.

10. The power limiter of claim 9, wherein the switch circuit further includes:
- an inductive element disposed on the signal path and having a first terminal and a second terminal; and
- a first shunt segment coupled with the first terminal and having at least two FETs of the one or more shunt FETs coupled in series with one another; and
- a second shunt segment coupled with the second terminal and having at least two FETs of the one or more shunt FETs coupled in series with one another.

11. The power limiter of claim 1, wherein the switch circuit includes a gallium nitride (GaN) transistor.

12. The power limiter of claim 1, wherein the switch circuit includes a gallium arsenide (GaAs) transistor.

13. The power limiter of claim 1, wherein the switch circuit includes a high electron mobility transistor (HEMT).

14. A system comprising:
- an antenna configured to receive an over-the-air transmission;
- a power limiter configured, the power limiter including:
  - a signal path configured to receive an input radio frequency (RF) signal based on the over-the-air transmission and to output an output RF signal;
  - a switch circuit coupled with the signal path;
  - a detector circuit coupled with the signal path and configured to provide a detection signal based on signal power of the input RF signal or the output RF signal; and
  - a bias circuit coupled with the switch circuit and configured to bias one or more components of the switch circuit to set the switch circuit in a first operational state or a second operational state based on the detection signal, wherein the first operational state is configured to provide greater limiting of the signal power relative to the second operational state and the second operational state is configured to provide less insertion loss relative to the first operational state; and
- a receiver coupled with the power limiter and configured to receive the output RF signal.

15. The system of claim 14, wherein the switch circuit comprises a single-pole, single-throw switch biased by two bias signals received from the bias circuit.

16. The system of claim 15, wherein the bias circuit is configured to output a first and a second bias signal to bias the one or more components of the switch circuit, wherein the bias circuit comprises:
- a differential amplifier having a pair of transistors, wherein:
  - a first transistor of the pair includes a first terminal coupled with ground through a first resistor, a second terminal coupled with a voltage source through a second resistor, and a gate coupled with the detector circuit to receive the detection signal, and
  - a second transistor of the pair includes a first terminal coupled with ground through a third resistor, a second terminal coupled with the second terminal of the first transistor, and a gate coupled with a voltage divider,
- wherein the differential amplifier is configured to output the first bias signal at the first terminal of the first transistor and to output the second bias signal at the first terminal of the second transistor.

17. The system of claim 14, wherein the system comprises a radar system.

18. The system of claim 14, wherein the power limiter is integrated into a monolithic integrated circuit (IC) or a multichip module (MCM).

19. A method of limiting a radio frequency (RF) signal, comprising:
- biasing a switch circuit to set the switch circuit in a first operational state;
- generating a detection signal based on a power of the RF signal;
- comparing the detection signal to a predetermined threshold;

biasing the switch circuit to set the switch circuit in a second operational state based on said comparing of the detection signal to the predetermined threshold, wherein the first operational state is configured to provide greater limiting of the power relative to the second operational state and the second operational state is configured to provide less insertion loss relative to the first operational state.

20. The method of claim 19, wherein said biasing the switch circuit to set the switch circuit in the first operational state comprises providing a first bias signal at approximately a first negative value or greater and a second bias signal at approximately a second negative value or less; and said biasing the switch circuit to set the switch circuit in the second operational state comprises providing the second bias signal at approximately the first negative value or greater and the first bias signal at approximately the second negative value or less.

* * * * *